May 15, 1956   G. L. HAZEN   2,745,539
FEED HOPPER FOR A RECIPROCATING TROUGH CONVEYOR
Filed Sept. 25, 1952   2 Sheets-Sheet 1
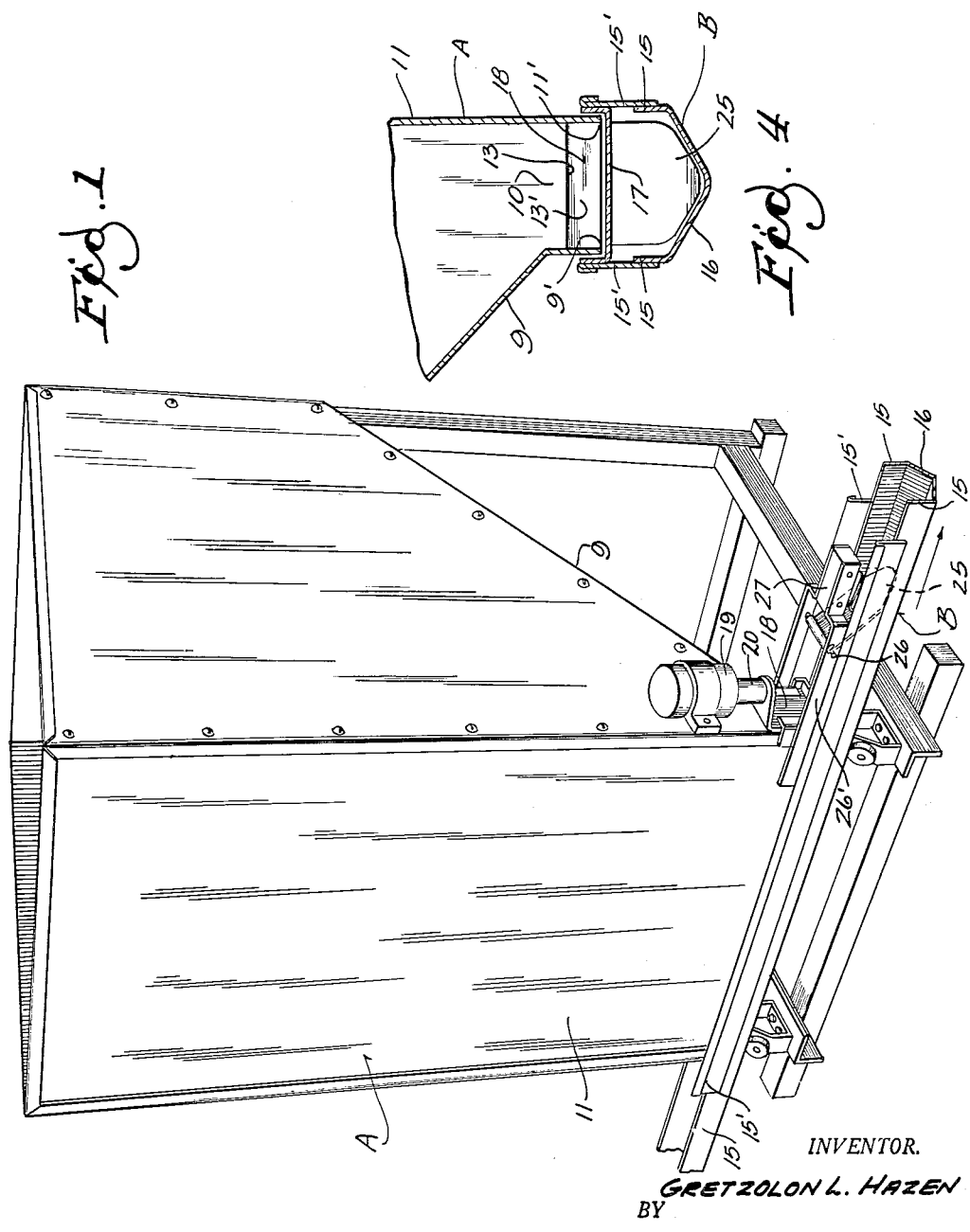
INVENTOR.
GRETZOLON L. HAZEN
BY
Wheeler, Wheeler & Wheeler
ATTORNEYS

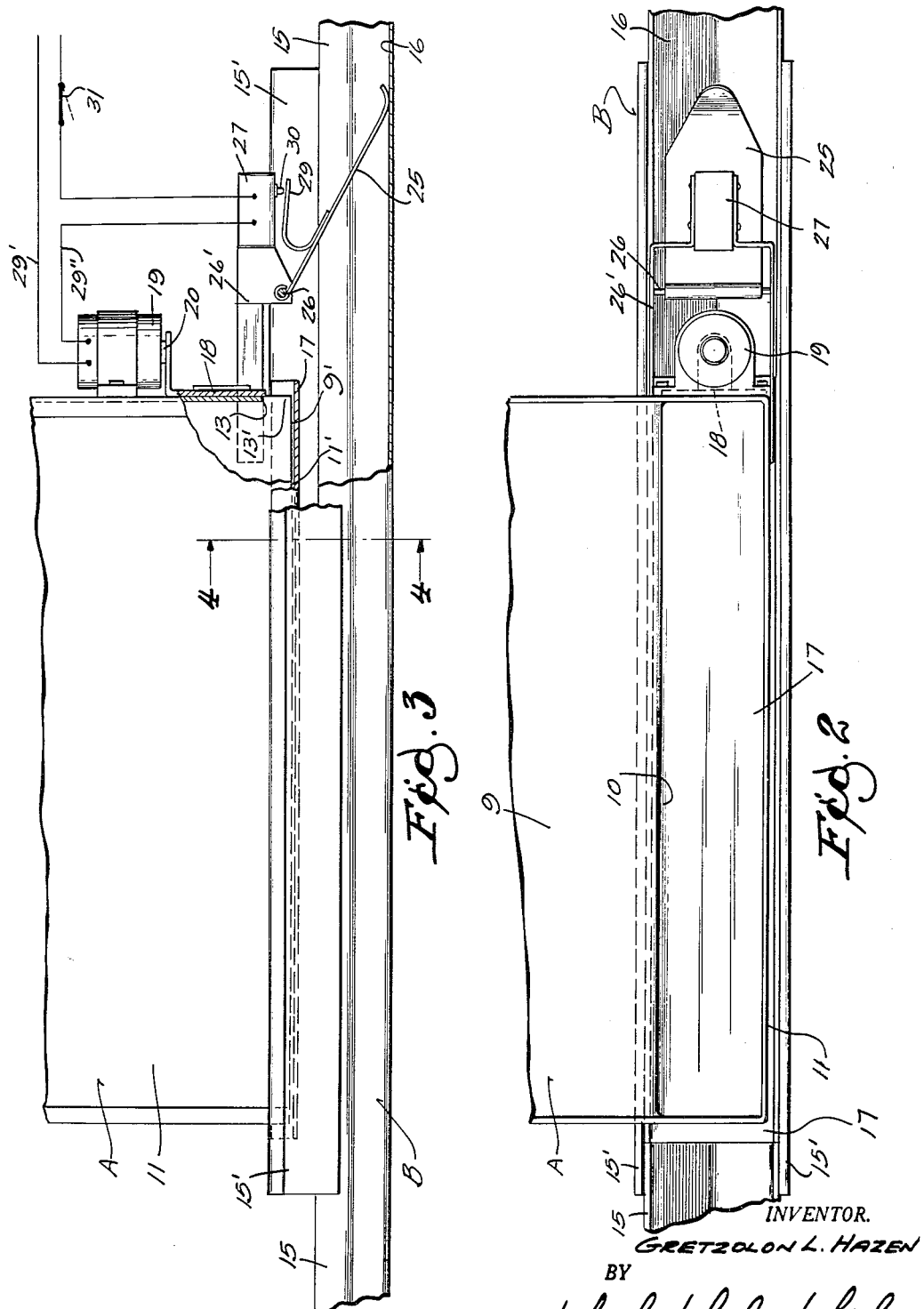

United States Patent Office 2,745,539
Patented May 15, 1956

2,745,539

FEED HOPPER FOR A RECIPROCATING TROUGH CONVEYOR

Gretzolon L. Hazen, Fort Atkinson, Wis., assignor to James Mfg. Co., Fort Atkinson, Wis., a company Application September 25, 1952, Serial No. 311,489

3 Claims. (Cl. 198—37)

The present invention relates to a hopper with means for supplying material to a reciprocating trough and for maintaining a desired height of material in the trough at a point near where it is fed into the trough.

A further novel feature of my invention is the means for controlling the material fed into the trough by the use of a flapper plate and an outlet valve in the hopper outlet and an operating connection therebetween, either mechanical or electrical. The preferred operating connection between the valve and flapper plate, is a micro switch connected to a solenoid, the core of which is mechanically connected to the valve, whereby when the flapper plate which rides over the material in the trough falls to a predetermined height, the switch will be closed and the valve raised or opened by the solenoid and whereby when the material in the trough raises to a predetermined height, the switch will be opened and the valve closed by gravity, thus to maintain a desired height of material in the trough between the hopper and flapper plate.

To these and other useful ends my invention consists of parts, combinations of parts or their equivalents and mode of operation as hereinafter described and claimed and shown in the accompanying drawings in which:

Fig. 1 is a view at an angle of a material hopper and illustrating the position of the material conveying trough.

Fig. 2 is a fractional top view of the hopper and trough as shown in Figure 1.

Fig. 3 is a fractional front view of the hopper showing a fraction of the trough and the preferred means for regulating the flow of the material into the trough.

Fig. 4 is an enlarged sectional view in part, of the trough and hopper taken on line 4—4 in Figure 3.

As illustrated the hopper in its entirety is designated by reference character A and the trough in its entirety is designated by reference character B.

Trough B is provided with an oscillating movement adapted to cause the material in the trough to move forward as indicated by arrows.

The oscillating movement of trough B may be brought about by an oscillating mechanism shown and described in my copending application, Serial Number 294,416, filed June 19, 1952, which imparts a suitable forward and rearward stroke to the trough.

As illustrated the bottom 9 of hopper A has a considerable depending angle so the material will flow freely by gravity toward a hopper outlet 10 which extends for the length of the hopper. The front panel 11 of hopper A terminates at its bottom as at 11' and the rear panel 9 terminates as at 9' forming the bottom outlet 10. The left hand end panel of hopper A extends to the bottom of panels 9 and 11. The right hand end panel 12 terminates at its bottom as at 13 thus forming a front end opening 13'. Trough B and associate troughs having side plates 15—15 and preferably a U-shaped bottom plate 16 are adapted to act as feeders for growing chicks and laying hens. I provide side plates 15'—15' which terminate a short distance from the left hand end of the hopper and a distance from the right hand end of the hopper as shown.

I provide a false bottom 17 for the trough B which is secured to the side walls of the trough and extends for a short distance past the front and rear ends of outlet 10. This false bottom is positioned in juxtaposition to the bottom of outlet 10 to thereby act substantially as a closure for this outlet. I provide a gate valve 18 for regulating end opening 13' and to which is rigidly attached a solenoid core 20, of solenoid 19.

I provide a flapper plate 25 having considerable length that is pivoted as at 26 to a stationary bracket 26'. This bracket has mounted thereon a microswitch 27. Member 25 has mounted thereon a flexible arm 29 which is adapted to contact projection 30 of microswitch 27 when the free end of member 25 is in its highest position caused by riding over the material as it flows forward as indicated and at the predetermined maximum height of the material. Switch 27 has 2 wires 29' and 29" leading to solenoid 19. Wire 29' is preferably connected to a source of electrical supply by means of a manually operated switch 31.

Switch 27 is adapted to open the solenoid circuit when the free end of member 25 is in its highest position. Solenoid 19 will then permit core 20 and valve 18 to fall by gravity and close outlet 13. When the free end of member 25 reaches the predetermined minimum height of material in the trough switch 27 will then be closed and the solenoid energized, acting on core 20 to lift valve 18, thus to permit the material to flow forward into the trough and eventually raise member 25 again and cause the valve to close, thus to maintain the desired material height in the trough between valve 18 and the forward end of flapper plate 25.

I may elect to operate valve 18 by direct mechanical connection from flapper plate 25. This design would not operate on the on and off principle as in the electric control as already described, but so long as trough B is oscillated the requirements for material will be supplied by a constant flow of material under gate valve 18, thus to maintain a desired level of material in the trough at the free end of the flapper plate.

As thus illustrated I have shown a hopper, a master trough and means for maintaining a desired height of material at the inlet end of the master trough, in a manner whereby the material will not clog at the outlet of the hopper or at the outlet valve, because of the oscillating motion of the master trough.

It will be understood that trough B may be extended and be adapted to supply feed to other troughs and that when my device is used as a feeder for pullets or laying hens the surplus feed may be returned to the master trough ahead of the hopper so as to provide a feeder adapted for continuous operation with very little and infrequent attention of the operator.

Thus it will be seen that applicant has provided a very simple effective means for supplying material into an oscillating feed trough and at low cost.

Having thus shown and described my invention, I claim:

1. In a feed device of the character described, the combination with a hopper having a feed spout with an open bottom and an end wall provided with a dispensing opening, of a reciprocating conveyor trough beneath said spout, said trough being provided with a bottom along which feed is conveyed and a false bottom spaced thereabove, said false bottom providing a bottom closure for the hopper spout, and means for reciprocating said trough together with said false bottom whereby to concurrently convey feed along said trough and agitate the feed in said hopper spout for free discharge of said feed through said dispensing opening into said trough.

2. The device of claim 1 in further combination with a gate across said dispensing opening, means for actuating said gate, level sensing means in said trough beyond said gate and responsive to the aggregate of feed on the trough bottom and feed delivered through said dispensing opening, and actuating connections between said level sensing means and said gate actuation means whereby to actuate said gate in response to the aggregate level of said feed.

3. The device of claim 1 in which said conveyor trough and hopper spout are elongated in the direction of trough reciprocation, said trough false bottom being elongated beyond the end walls of the spout a distance at least equal to the movement of the conveyor trough in one reciprocation thereof whereby to maintain said false bottom closed against said spout bottom regardless of trough reciprocation.

References Cited in the file of this patent

UNITED STATES PATENTS

| | | |
|---|---|---|
| 1,580,585 | Church | Apr. 13, 1926 |
| 2,098,034 | Flint et al. | Nov. 2, 1937 |
| 2,590,968 | Hill | Apr. 1, 1952 |

FOREIGN PATENTS

| | | |
|---|---|---|
| 460,206 | Germany | May 24, 1928 |